Anomalies
CLASSIFICATION
9097
DIVISION
CRADLING MACHINE; ND GRASS CUTT R.
Patented 18 Sep 1849
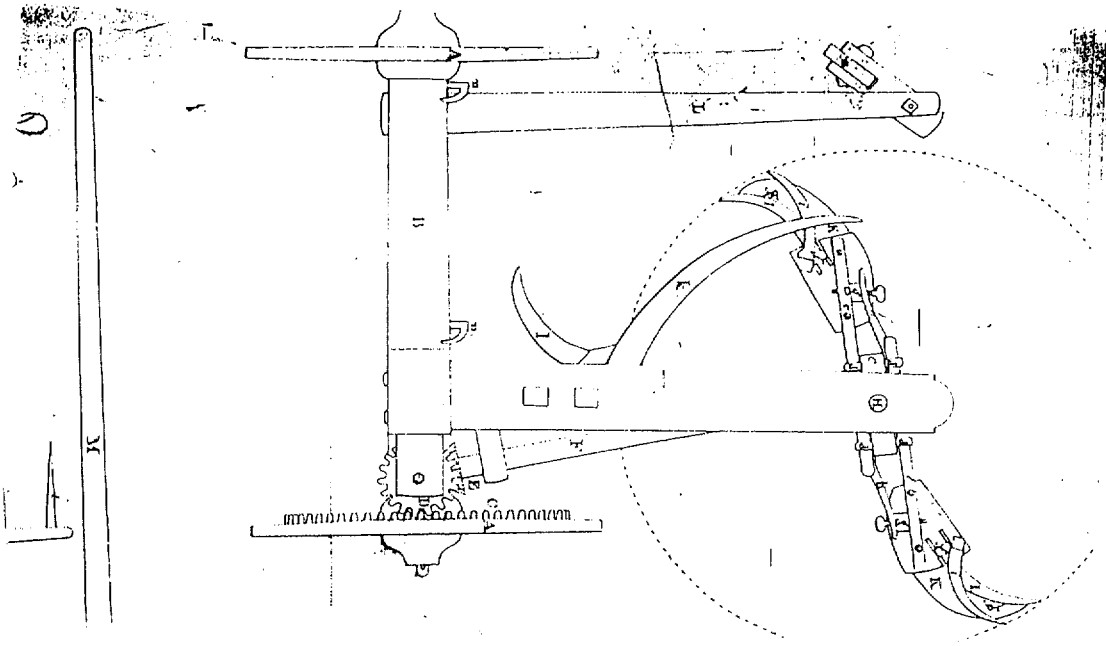
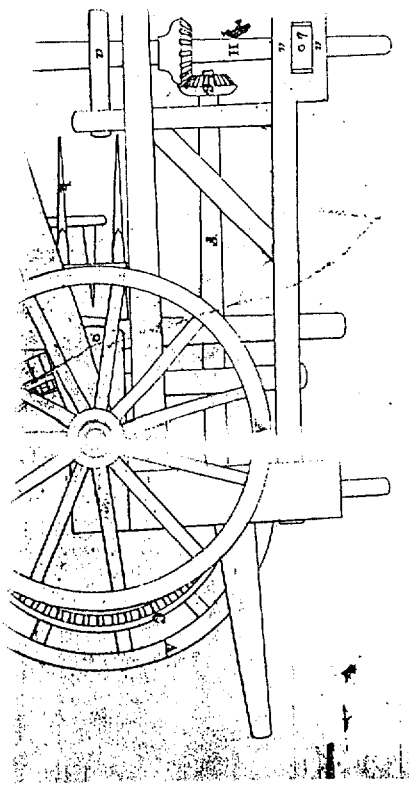

[illegible]

Sept. 18 1835 321

Edward Badlam Jr. of Chester, Vermont.
Letters Patent 9097X

The schedule referred to in these Letters Patent and making part of the same, containing a description in the words of the said Edward Badlam Junior, himself, of his improvement in a machine called a cradling machine and grass cutter - - - -

---

To all to whom these presents shall come: Be it known that I Edward Badlam of Chester, in the County of Windsor, and State of Vermont, have invented a new and useful improvement in the machine for cradling grain and cutting grass, called a cradling machine and grass cutter & that the following is a full and exact description of my said improvement. The cradling machine and grass cutter is constructed as follows reference being had to the annexed drawings. Two cast wheels A.A. are put on to a strong and permanent axeltree B. on the inside of one of the wheels A, is a face cog wheel C, which mashes into a pinion D. the under surface of which is made into a bevelled cog wheel. which mashes into another bevelled pinion E. on the shaft F. on the other end of the shaft F. there is a bevelled wheel G. mashing into a wheel on the perpendicular shaft H. which works in boxes a.a.a. and is kept in its place by a shoulder b. To the lower end of the shaft H. is attached a cross piece c. with iron loops d.d.d.d. in which work the handles e.e. of the cythes I.I. back of the sythes are two pieces of wood K.K. Which are provided with small rollers f.f.f.f. that run on the ground to raise the cythes over small knowles g.g. are two arms attached to the handles e.e. that work against the springs h.h. above the sythes I.I. are fingers i.i. that pass through between the long fingers k.k. in the course of their revolution and discharge the grass or grain, that has bin cut against the inclined rack l. which by its inclination lays the grass or grain on the ground in the same way as a hand cradle. To the axletree B. is attached a projecting bar L. with a custer roller m. on its end for the purpose of regulating the rise and fall of the machine when passing over elevations on the ground. The pole M, to which the teem is geared is fixed to the two hooks n n.

9097X

Weight is applied to the axletree B. for the purpose of giving the wheels A.A.
a firm hold on the ground. Operation — When the horse which is attached
to the poll M. moves forward the wheels A.A. are made to revolve and by
the cog wheels give motion to the shaft H. to which the cythes are attached.
The cythes in their revolutions, cut the grass or grain, then the fingers i. catch
it, and carry it along the outside of the long fingers k, untill it is dischar-
-ged against the rack, l, and thence upon the ground —
The operation is thus continued untill the machine reaches the end of
the field when it is renewed; What I claim as new, as my improvement and
for which I solicit Letters Patent are the springs marked h.h, with the fix-
-tures for enabling the sythes to pass over small knowles, and the fingers i.i.
k.k, and the rack l. for the purpose of catching and laying the grass and
grain after being cut by the sythes. In testimony that the above is a true
specification of my said improvements as above described, I have hereunto
set my hand this 5th day of September in the year of our Lord one thou-
-sand eight hundred and thirty-five —

Witnesses
Ch. M. Keller
Clement T. Coote

Edward Badlam Junr (Drawing)

Exd.
[illegible]

[752